US008060766B2

(12) United States Patent　　(10) Patent No.: US 8,060,766 B2
Konstadinidis et al.　　(45) Date of Patent: Nov. 15, 2011

(54) MICROPROCESSOR PERFORMANCE AND POWER OPTIMIZATION THROUGH INDUCTIVE VOLTAGE DROOP MONITORING AND CORRECTION

(75) Inventors: Georgios K. Konstadinidis, Santa Clara, CA (US); Sudhakar Bobba, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 494 days.

(21) Appl. No.: 12/399,736

(22) Filed: Mar. 6, 2009

(65) Prior Publication Data

US 2010/0229021 A1　　Sep. 9, 2010

(51) Int. Cl.
*G06F 1/00*　　(2006.01)
*H03B 19/00*　　(2006.01)
(52) U.S. Cl. ......... 713/322; 713/500; 327/101; 327/114
(58) Field of Classification Search .................... 713/500
See application file for complete search history.

(56) References Cited

U.S. PATENT DOCUMENTS

| 7,225,349 | B2 * | 5/2007 | Tam et al. | 713/322 |
|---|---|---|---|---|
| 7,394,301 | B2 * | 7/2008 | Fetzer et al. | 327/262 |
| 7,409,568 | B2 * | 8/2008 | Tam et al. | 713/322 |
| 2003/0112038 | A1 * | 6/2003 | Naffziger et al. | 327/100 |
| 2005/0231259 | A1 * | 10/2005 | Fetzer et al. | 327/261 |
| 2006/0253719 | A1 * | 11/2006 | Tam et al. | 713/300 |
| 2007/0283172 | A1 * | 12/2007 | Douriet et al. | 713/300 |
| 2009/0199027 | A1 * | 8/2009 | Floyd et al. | 713/323 |

* cited by examiner

*Primary Examiner* — Ryan Stiglic
(74) *Attorney, Agent, or Firm* — Osha Liang LLP (57) ABSTRACT

A voltage droop monitoring and correcting circuit for a microprocessor includes: a monitor circuit configured to monitor voltage droops of the microprocessor and perform a temporary clock-skipping technique to compensate for the voltage droops. A method for monitoring and correcting voltage droops of a microprocessor includes: monitoring voltage droops of the microprocessor; and performing a temporary clock-skipping technique to compensate for the voltage droops. A computer system includes memory; a processor operatively connected to the memory; and computer-readable instructions stored in the memory for causing the processor to: monitor voltage droops of the microprocessor; and perform a temporary clock-skipping technique to compensate for the voltage droops.

20 Claims, 8 Drawing Sheets

*Voltage Droop Slope Detector 200 Output State Combinations

|  | Flip Flop 1 | Flip Flop 2 |  |
|---|---|---|---|
| State 1 | 0 | 0 | No droop violation in old or new cycle - No action |
| State 2 | 1 | 0 | Droop violation in new cycle but not in old cycle - No action |
| State 3 | 0 | 1 | Droop violation in old cycle but not in new cycle - No action |
| State 4 | 1 | 1 | Droop violation in both cycles - Take action |

FIG. 8 ained below 10 mV. Voltage droops caused by inductive effects, on the other hand, are more difficult to manage and could cause a much larger voltage drop. A voltage droop refers to loss of supply voltage as a device tries to drive a load. For example, when power is supplied to a microprocessor, the sudden increase in current through the microprocessor causes a loss in the supply voltage due to the package inductance. In other words, the sudden increase in the current drawn by the microprocessor causes a voltage droop because there is a high rate of change of current through the microprocessor package inductance.

MICROPROCESSOR PERFORMANCE AND POWER OPTIMIZATION THROUGH INDUCTIVE VOLTAGE DROOP MONITORING AND CORRECTION

BACKGROUND OF INVENTION

1. Field of the Invention

The present disclosure relates generally to microprocessors, and more specifically to methods for enhancing microprocessor performance and power through inductive voltage droop monitoring and correction.

2. Background Art

Microprocessor speed for a given design depends largely on supply voltage at the transistor level. Voltage regulators may be used to maintain a constant supply voltage to the microprocessor. The voltage provided externally by the regulator is higher than the voltage at the transistor level because it needs to compensate for the voltage drop on the package and microprocessor power supply rails. This voltage drop has two components: ohmic resistance (IR drop) and voltage droop (Ldi/dt).

Through proper package design, the IR voltage drop may be maintained below 10 mV. Voltage droops caused by inductive effects, on the other hand, are more difficult to manage and could cause a much larger voltage drop. A voltage droop refers to loss of supply voltage as a device tries to drive a load. For example, when power is supplied to a microprocessor, the sudden increase in current through the microprocessor causes a loss in the supply voltage due to the package inductance. In other words, the sudden increase in the current drawn by the microprocessor causes a voltage droop because there is a high rate of change of current through the microprocessor package inductance.

Depending on the power variation frequency, the microprocessor may hit the capacitance resonance frequency, in which case a large voltage droop (150 mV or more) can occur at the voltage supply at the transistor level. This can cause significant speed reduction and, in severe cases, microprocessor failure. Conventionally, operating margins were added in the timing analysis to compensate for voltage droops and ensure the microprocessor will function. As microprocessors and other semiconductor devices continue to become powerful and complex, preventing voltage droops to maintain a constant supply voltage has become an increasingly significant concern for developers.

SUMMARY OF INVENTION

In one aspect, embodiments of the invention relate to a voltage droop monitoring and correcting circuit for a microprocessor, the circuit comprising: a monitor circuit configured to monitor voltage droops of the microprocessor and perform a temporary clock-skipping technique to compensate for the voltage droops.

In one aspect, embodiments of the invention relate to a method for monitoring and correcting voltage droops of a microprocessor, the method comprising: monitoring voltage droops of the microprocessor; and performing a temporary clock-skipping technique to compensate for the voltage droops.

In one aspect, embodiments of the invention relate to a computer system comprising: memory; a processor operatively connected to the memory; and computer-readable instructions stored in the memory for causing the processor to: monitor voltage droops of the microprocessor; and perform a temporary clock-skipping technique to compensate for the voltage droops.

Other aspects and advantages of the invention will be apparent from the following description and the appended claims.

DETAILED DESCRIPTION

Specific embodiments of the disclosure will be described with reference to the accompanying figures. Like items in the figures are shown with the same reference numbers.

In the following detailed description of embodiments, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

According to one or more embodiments, a voltage droop monitoring and correcting system monitors voltage droops of a microprocessor through a digital monitor circuit (Ldi/dt monitor), and monitors rate of change of the voltage droops over two or more consecutive cycles through a digital slope detector circuit (voltage droop slope detector).

An Ldi/dt monitor in accordance with an embodiment of the present invention monitors supply voltage at the transistor level and its direct impact on the microprocessor speed at a given clock cycle. The Ldi/dt monitor may imitate the most critical timing path on the microprocessor, and take action by performing a temporary clock-skipping technique to minimize voltage droop. For example, when droop is detected (e.g., when a voltage drop of 20 mV or more is detected), the microprocessor clock may be temporarily stopped, allowing the supply voltage to recover to its normal level. In one or more embodiments, the reaction time for the clock-skipping is within a few clock cycles of the microprocessor, e.g., 2.5 ns which corresponds to 5 clock cycles for a 2 GHz microprocessor.

Figure 1:
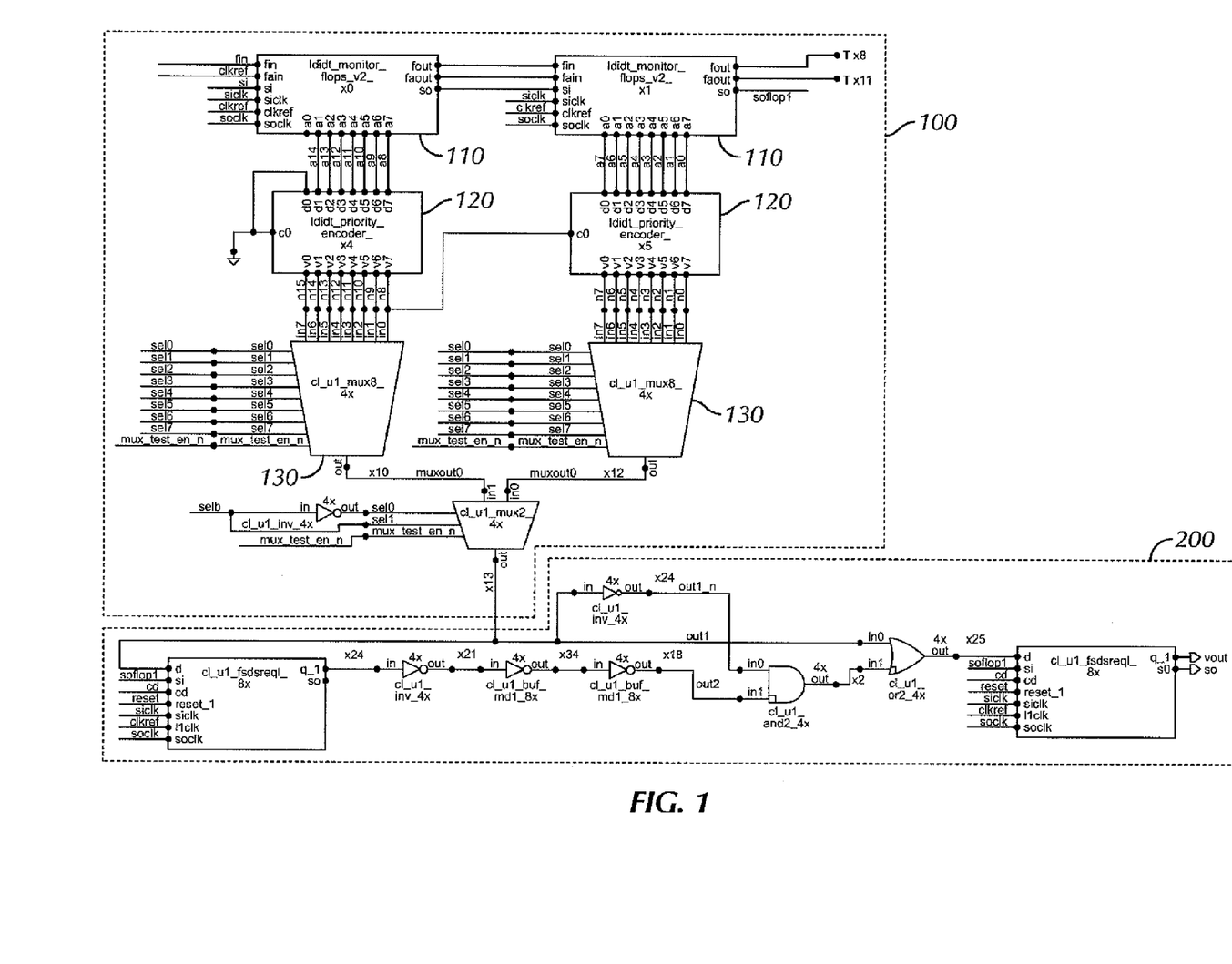
FIG. 1 shows a toplevel schematic diagram of a voltage droop monitoring and correcting system in accordance with an embodiment of the present invention.
Figure 2:
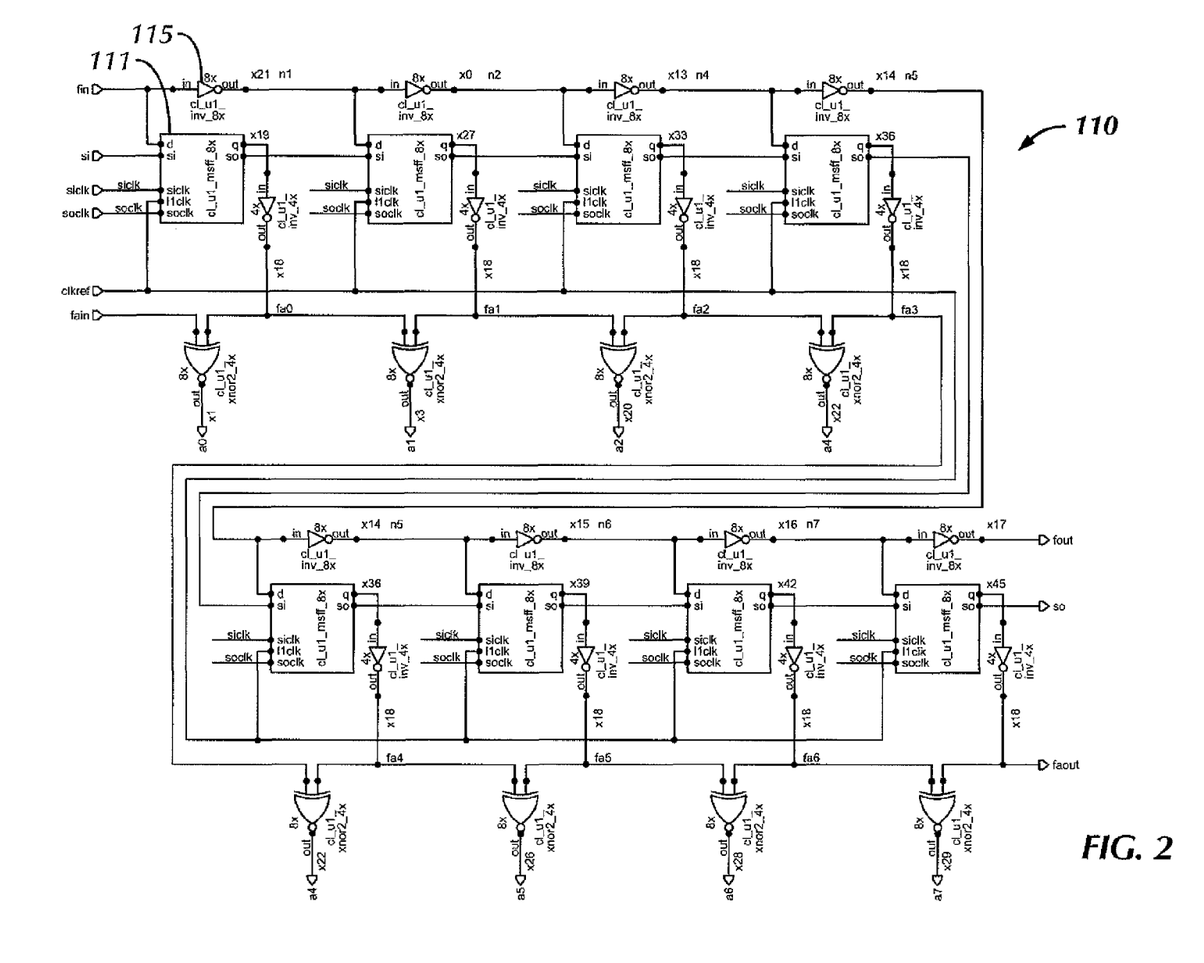
FIG. 2 shows a schematic diagram of a delay circuit in accordance with an embodiment of the present invention.

FIG. 1 shows a top-level schematic of a voltage droop monitoring and correcting system 1 in accordance with an embodiment of the present invention. The system 1 includes an Ldi/dt monitor 100. The monitor 100 may include delay circuits 110. FIG. 2 shows a detailed schematic of the delay circuit 110. As shown in FIG. 2, the delay circuits 110 may include an inverter delay chain 115 feeding a chain of flip flops 111 clocked by the microprocessor's clock signal. The delay in the delay line may be based on the supply voltage of the microprocessor such that the delay will increase if a droop occurs, and vice-versa. The monitor 100 may be configured such that the flip flops 111 will maintain a state of "1" when they are fed with late data (e.g., data after a rising edge of the microprocessor clock cycle), and a state of "0" when there is no delay. The supply voltage droop modulates the delay in the delay chain of the monitor 100, and there will be a shift in the flip flop location where the "0" to "1" transition occurs. Voltage granularity sensitivity improves with reduced delay per stage in the delay chain. When the monitor 100 detects a voltage droop, it takes action by performing a temporary clock-skipping technique to minimize the voltage droop.

The delay in the delay line may be shorter than the setup and hold time of the flip flops. Therefore, in one or more embodiments, the Ldi/dt monitor may also include a priority encoder. When the delay line is shorter than the setup and hold time of the flip flops, false triggering of the output may result not only on the critical flip flop output but also on some of the other flip flops downstream. This causes propagation of bubbles. To mitigate this effect, the output of the delay circuit may be inputted into a priority encoder, which gives priority to the most significant bit of the Ldi/dt monitor output.

Figure 4:
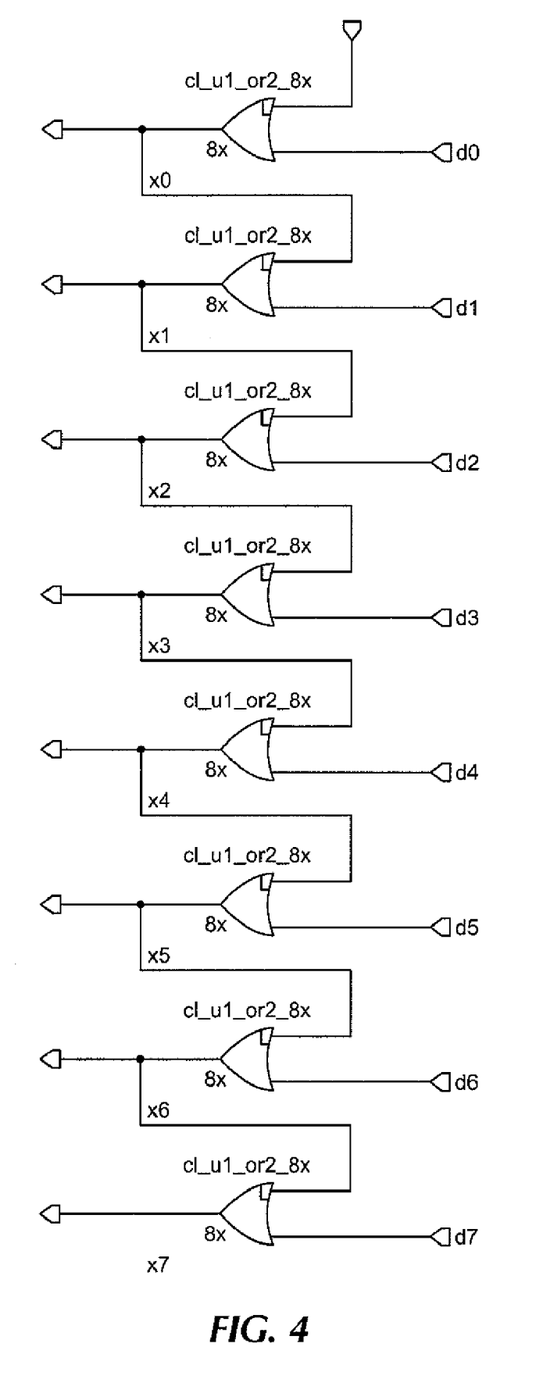
FIG. 4 shows a schematic diagram of a priority encoder in accordance with an embodiment of the present invention.

Accordingly, in the embodiment shown in FIG. 1, the Ldi/dt monitor 100 includes priority encoders 120. FIG. 4 shows a detailed schematic of the priority encoders 120. As shown in FIG. 1, outputs of the delay circuits 100 are fed into the priority encoders 120, and outputs of the priority encoders 120 are fed into a pair of multiplexers 130. This guarantees that the less significant bits of the flip flop outputs will follow when the most significant bit gets activated, and the priority encoders 120 and the multiplexers 130 can eliminate the propagation of bubbles in subsequent stages while maintaining the detection sensitivity. This configuration may be used for workload/current adjustment to minimize voltage droops and their impact on the microprocessor performance.

Figure 3:
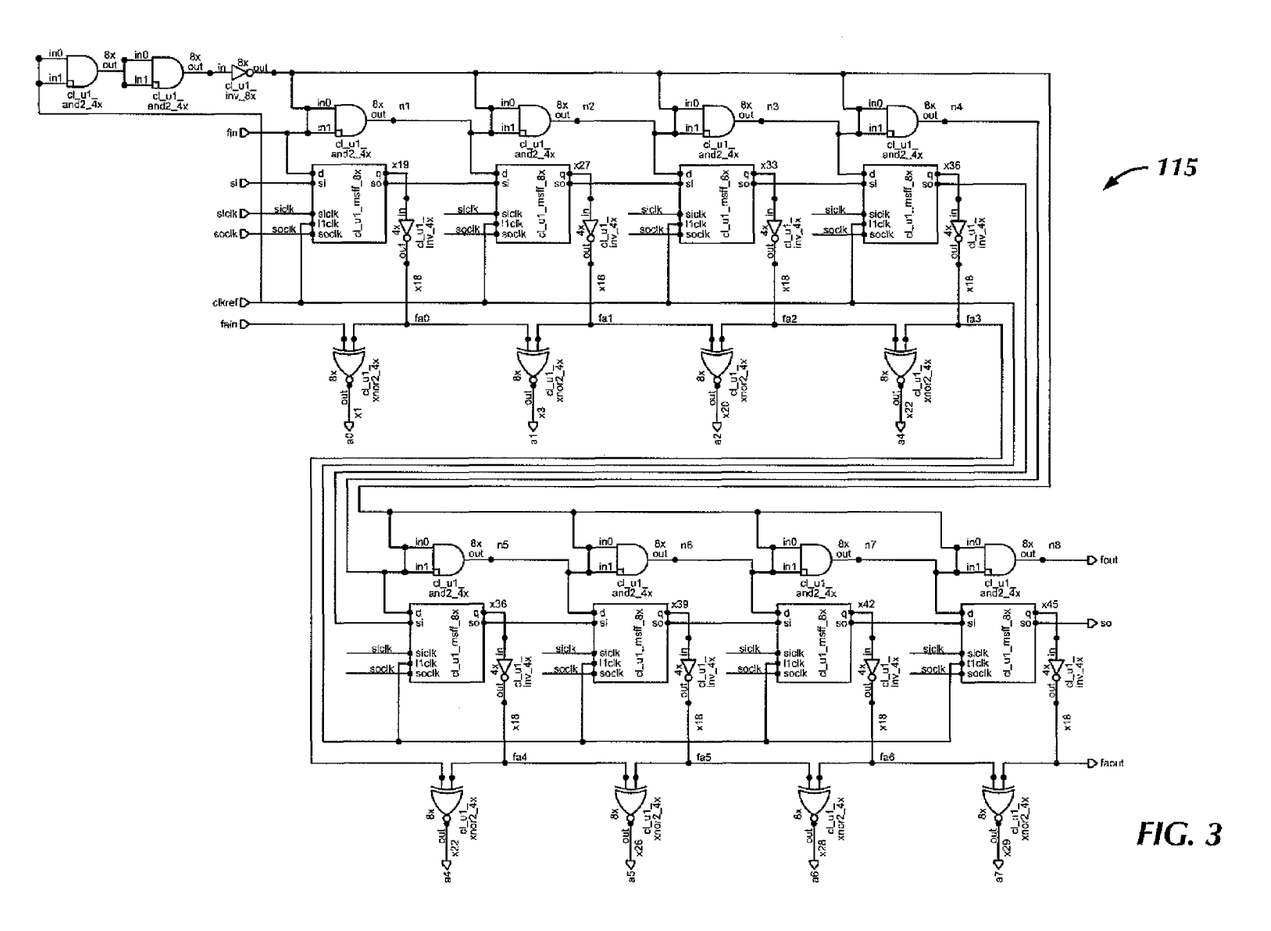
FIG. 3 shows a schematic diagram of another delay circuit in accordance with an embodiment of the present invention

Those skilled in the art will appreciate many variations to the Ldi/dt monitor 100 shown in FIG. 1 that are within the spirit of the present invention. FIG. 3, for example, illustrates a variation of the delay circuit in accordance with another embodiment of the present invention.

One or more embodiments of the voltage droop monitoring and correcting system may also include a voltage droop slope detector. With the slope detector, in addition to monitoring the actual voltage droop within each clock cycle, the system can also monitor the rate of change of the voltage droop over two or more consecutive cycles. This may be implemented, for example, by using a shift register that keeps track of the states of the Ldi/dt monitor output over consecutive cycles. More specifically, in one or more embodiments, the voltage droop slope detector may be implemented by an n-stage shift register that holds output states of the Ldi/dt monitor for n consecutive cycles. The system may be configured to take action only when the shift register detects a voltage droop violation (e.g., voltage drop of 20 mV or more) in two or more consecutive cycles. For example, when a voltage droop violation is detected in two or more consecutive cycles, the system may temporarily disable the main clock. This stops the current surge that is causing the droop, and allows the supply voltage to recover. The shift register ensures that the monitor takes corrective action at the starting point of resonance buildup and not overreact to smaller glitches that will clear in the next cycle. Avoiding overreaction prevents unnecessary cycle skipping and reduces overcompensation that may negatively affect system stability and performance.

Consistent with the above description, the system 1 includes a voltage droop slope detector 200, as shown in FIG. 1. The slope detector 200 is implemented by a two-stage shift register that monitors the voltage droop over two consecutive cycles. Because this is a two-stage shift-register, the output can have up to four state combinations. Specifically, the two-stage shift register will have one of the following four states at each clock cycle: state 1 (00), state 2 (10), state 3 (01), and state 4 (11).

Figure 5:
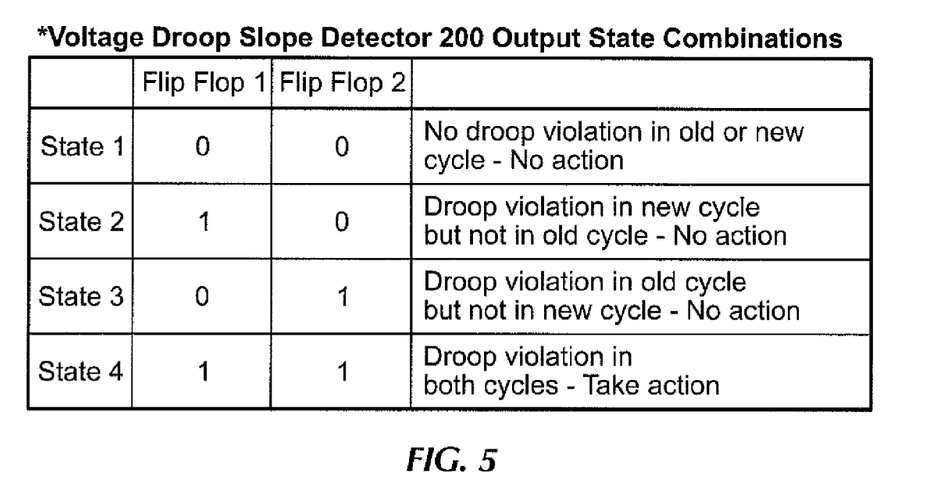
FIG. 5 shows a table of example output state combinations of a slope detector in accordance with an embodiment of the present invention.

The right-side bit of the output of the slope detector 200 may represent the old cycle and the left-side bit the new cycle (i.e., the cycle immediately following the old cycle). More specifically, as shown in FIG. 5, state 1 (00) indicates there was no droop violation in either cycle; state 2 (10) indicates there was no droop violation in the old cycle but a violation occurred in the new cycle; state 3 (01) indicates there was a droop violation in the old cycle but not in the new cycle, which means the droop cleared after one clock cycle; and state 4 (11) indicates there was a droop violation in both cycles (11). In one embodiment, clock-skipping is performed only if there is a droop violation in two or more consecutive cycles, as indicated by state 4. This prevents the system 1 from overreacting to small glitches that will clear in the next cycle, and confirms that action is taken at a starting point of a resonance buildup. A similar process may be followed to monitor any number of consecutive cycles. For example, to monitor droop violation in three consecutive cycles, a three-stage shift register with a three-bit output may be used.

Those skilled in the art will appreciate many variations to the above process that are within the spirit of the present invention. In another embodiment of the present invention, for example, the system may react and disable the clock when the slope detector indicates that the supply voltage fell below a predetermined voltage limit at cycle N, which will force the recovery action. If the droop continues to the next cycle (N+1), the system keeps the clock disabled. When the supply voltage recovers and there is no droop violation in new cycle M, the slope detector checks if there was a violation in the previous cycle (M−1). If there was a droop violation, the system keeps the clock disabled (this allows for small overshooting above the triggering point). If a violation was not detected in the previous cycle, the system enables the clock.

Figure 6:
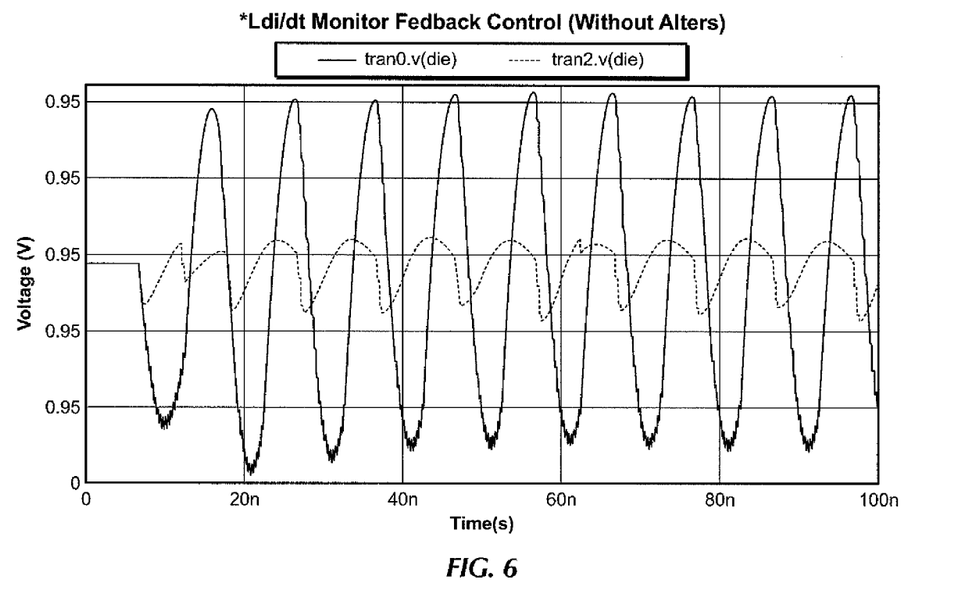
FIG. 6 shows an example waveform of supply voltage of a microprocessor utilizing the voltage droop monitoring and correcting system in accordance with an embodiment of the present invention.
Figure 7:
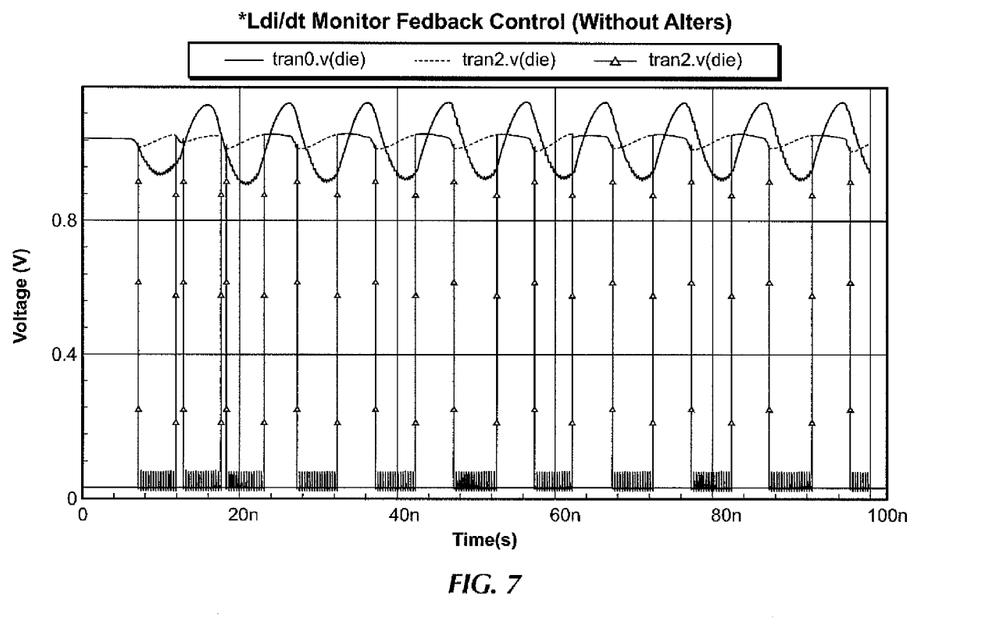
FIG. 7 shows another example waveform of supply voltage of a microprocessor utilizing the voltage droop monitoring and correcting system in accordance with an embodiment of the present invention.

FIGS. 6 and 7 show example waveforms of supply voltage of a microprocessor utilizing the voltage droop monitoring and correcting system in accordance with an embodiment of the present invention. The waveforms show the supply voltage at a chip capacitance resonance frequency. Referring to the legend in FIGS. 6 and 7, "tran0.$v$(die)" represents the waveform when the voltage droop slope detector is enabled, and "tran2.$v$(die)" represents the waveform when the voltage droop slope detector is disabled. As can be seen in FIGS. 6 and 7, large voltage droops can be observed in the supply voltage when the detector 200 is disabled (tran2.$v$). On the other hand, when the detector 200 is enabled (tran0.$v$), there are no voltage droops and the supply voltage level is more uniform. FIG. 7 also shows the output of the slope detector, denoted by "tran0.$v$(vout)." As can be seen, tran0.$v$(vout) is "0" when there is a voltage droop. The "0" output signal indicates that the main clock is disabled. This stops the current surge through the microprocessor and allows the droop to recover. On the other hand, tran0.$v$(vout), is "1" when there is no voltage droop. The "1" output signal indicates that the clock is enabled and clock-skipping is not performed because a voltage droop violation was not detected.

Figure 8:
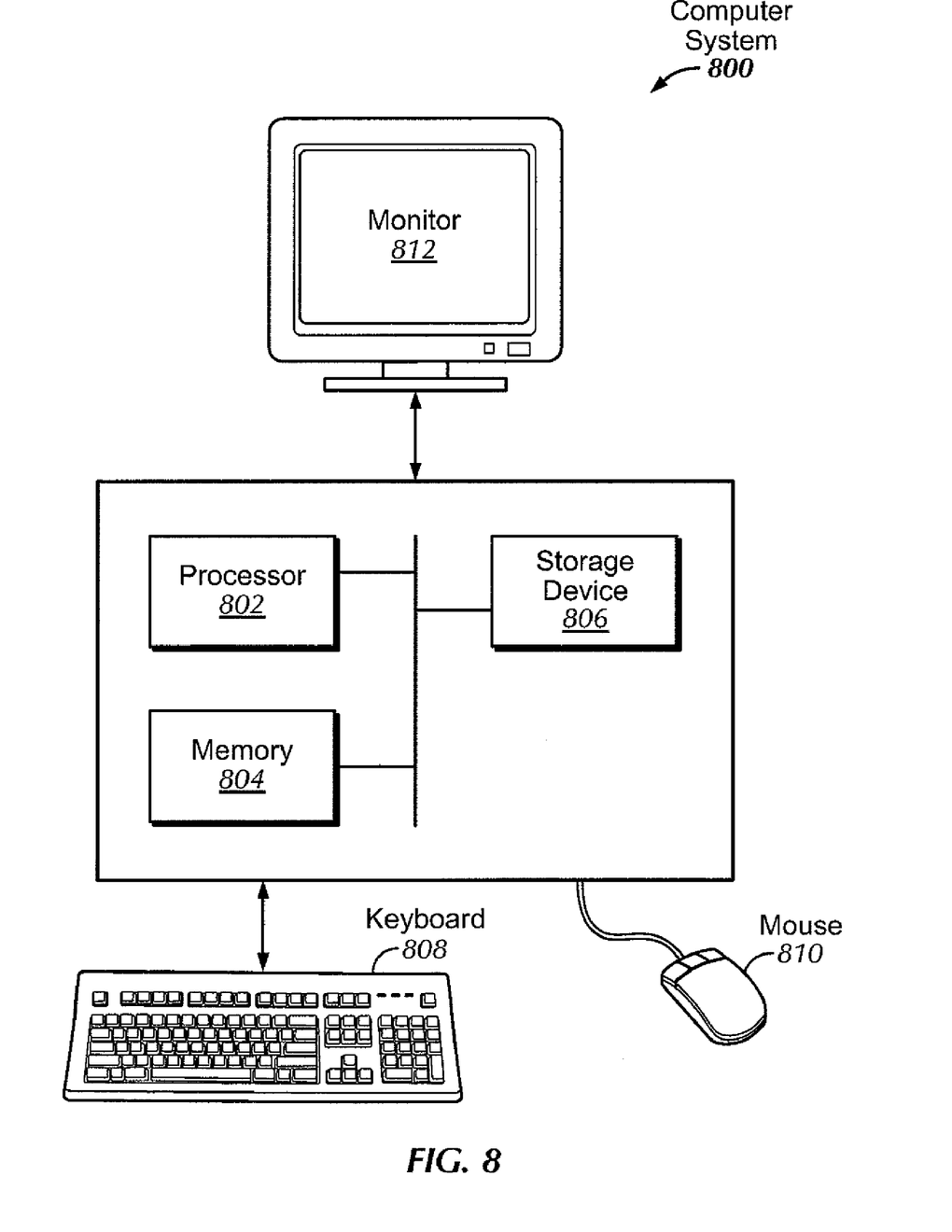
FIG. 8 shows a computer system in accordance with an embodiment of the present invention.

The voltage droop monitoring and correcting process described above may be implemented on any type of computer system. For example, as shown in FIG. 8, a computer system 800 includes a processor 802, associated memory 804, a storage device 806, and numerous other elements and functionalities typical of today's computers (not shown). The memory 804 may include instructions for causing the processor 802 to monitor voltage droops and perform a temporary clock-skipping technique to compensate for the voltage droops in accordance with one or more embodiments of the present invention. The computer 800 may also include input means, such as a keyboard 808 and a mouse 810, and output means, such as a monitor 812. The computer system 800 is connected to a local area network (LAN) or a wide area network (e.g., the Internet) (not shown) via a network interface connection (not shown). Those skilled in the art will appreciate that these input and output means may take other forms, now known or later developed.

Further, those skilled in the art will appreciate that one or more elements of the aforementioned computer system 800 may be located at a remote location and connected to the other elements over a network. Further, the invention may be implemented on a distributed system having a plurality of nodes, where each portion of the invention (e.g., intrusion detection system, response rewriter, server, client) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a tangible computer readable medium such as a digital video disc (DVD), compact disc (CD), a diskette, a tape, or any other suitable tangible computer readable storage device.

Advantages of embodiments of the present invention may include one or more of the following. According to one or more embodiments, notwithstanding changes in supply current, supply voltage of a microprocessor can be maintained at a steady level. As a result, additional operating margins need not be added in the timing analysis, and microprocessor speed and power can be enhanced. In other words, due to the reduced requirement on the Ldi/dt timing margins, power consumption can be reduced and microprocessor speed and thread performance can be improved. Embodiments of the present invention also have a much faster reaction time than voltage regulators to compensate for the voltage droop.

The improved Ldi/dt monitor design according to one or more embodiments can reduce metastability and eliminate propagation of "bubbles" (i.e., delays) in the monitor flip-flop chain without sacrificing delay/voltage sensitivity granularity. Further, the self-contained design may be disposed in one or several locations across a chip, and does not create additional overhead in terms of design, integration, or verification. This enables the microprocessor design to reach a higher potential.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A voltage droop monitoring and correcting circuit for a microprocessor, the circuit comprising:
    a monitor circuit configured to monitor voltage droops of the microprocessor and perform a temporary clock-skipping technique to compensate for the voltage droops,
    wherein the monitor circuit comprises:
    a delay circuit comprising:
    a plurality of flip flops connected in series and clocked by a microprocessor clock signal; and
    a delay chain connected to inputs of the plurality of flip flops, wherein delay in the delay chain depends on supply voltage of the microprocessor,
    wherein the monitor circuit further comprises a priority encoder into which outputs of the plurality of flip flops are input, and
    wherein the priority encoder guarantees that less significant bits of the flip flop outputs will follow when the most significant bit gets activated.

2. The voltage droop monitoring circuit according to claim 1, further comprising a voltage droop slope detector configured to detect a rate of change of the voltage droops.

3. The voltage droop monitoring circuit according to claim 2, wherein the voltage droop slope detector comprises a shift register configured to store output states of the monitor circuit over consecutive microprocessor clock cycles.

4. The voltage droop monitoring circuit according to claim 3, wherein the clock-skipping technique is performed only when the voltage droop slope detector detects a voltage droop violation in two or more consecutive microprocessor clock cycles.

5. The voltage droop monitoring circuit according to claim 3, wherein the clock-skipping technique is performed when the voltage droop slope detector detects a voltage droop violation, and the clock-skipping is ceased when the voltage droop slope detector indicates no droop violation over at least two consecutive microprocessor clock cycles.

6. The voltage droop monitoring circuit according to claim 3, wherein the monitor circuit monitors supply voltage of the microprocessor at transistor level.

7. The voltage droop monitoring circuit according to claim 3, wherein the clock-skipping technique is performed within five microprocessor clock cycles of the voltage droop.

8. A method for monitoring and correcting voltage droops of a microprocessor, the method comprising:
    monitoring voltage droops of the microprocessor;
    performing a temporary clock-skipping technique to compensate for the voltage droops;
    connecting a plurality of flip flops in series;
    clocking the plurality of flip flops by a microprocessor clock signal;
    connecting a delay chain to inputs of the plurality of flip flops;
    configuring the delay chain such that the delay depends on supply voltage of the microprocessor; and
    connecting outputs of the plurality of flip flops to inputs of a priority encoder,
    wherein the priority encoder guarantees that less significant bits of the flip flop outputs will follow when the most significant bit gets activated.

9. The method according to claim 8, further comprising detecting a rate of change of the voltage droops.

10. The method according to claim 9, further comprising storing output states of the priority encoder in a shift register over consecutive microprocessor clock cycles.

11. The method according to claim 10, wherein the clock-skipping step is performed only when a voltage droop violation is detected in two or more consecutive microprocessor clock cycles.

12. The method according to claim 10, wherein the clock-skipping step is performed when a voltage droop violation is detected, and the clock-skipping is ceased when no droop violation is detected over at least two consecutive microprocessor clock cycles.

13. The method according to claim 10, further comprising monitoring supply voltage of the microprocessor at transistor level.

14. The method according to claim 10, wherein the clock-skipping step is performed within five microprocessor clock cycles of the voltage droop.

15. A computer system comprising:
memory;
a processor operatively connected to the memory; and
computer-readable instructions stored in the memory for causing the processor to:
monitor voltage droops of the microprocessor; and
perform a temporary clock-skipping technique to compensate for the voltage droops;
connecting a plurality of flip flops in series;
clocking the plurality of flip flops by a microprocessor clock signal;
connecting a delay chain to inputs of the plurality of flip flops;
configuring the delay chain such that the delay depends on supply voltage of the microprocessor; and
connecting outputs of the plurality of flip flops to inputs of a priority encoder,
wherein the priority encoder guarantees that less significant bits of the flip flop outputs will follow when the most significant bit gets activated.

16. The computer system according to claim 15, further comprising instructions for causing the processor to:
detect a rate of change of the voltage droops; and
perform the clock-skipping technique when a voltage droop violation is detected in two or more consecutive microprocessor clock cycles.

17. The computer system according to claim 16, further comprising instructions for causing the processor to:
store output states of the priority encoder in a shift register over consecutive microprocessor clock cycles.

18. The computer system according to claim 16, wherein the clock-skipping step is performed when a voltage droop violation is detected, and the clock-skipping is ceased when no droop violation is detected over at least two consecutive microprocessor clock cycles.

19. The computer system according to claim 16, further comprising instructions for causing the processor to:
monitor supply voltage of the microprocessor at transistor level.

20. The computer system according to claim 16, wherein the clock-skipping step is performed within five microprocessor clock cycles of the voltage droop.

* * * * *